United States Patent [19]

Fujiune et al.

[11] Patent Number: 6,044,049
[45] Date of Patent: Mar. 28, 2000

[54] OPTICAL INFORMATION APPARATUS EMPLOYING TWO DIFFERENT TRACKING ERROR SIGNALS BASED ON REGIONS ON INFORMATION MEDIUM

[75] Inventors: Kenji Fujiune, Neyagawa; Mitsuro Moriya, Ikoma; Hiroyuki Yamaguchi, Hirakata; Shin-ichi Yamada, Katano; Katsuya Watanabe, Suita, all of Japan

[73] Assignee: Matsushita Electric Industrial Co., Ltd., Osaka, Japan

[21] Appl. No.: 08/951,140

[22] Filed: Oct. 15, 1997

[30] Foreign Application Priority Data

Oct. 16, 1996 [JP] Japan ..................................... 8-273168

[51] Int. Cl.⁷ ..................................................... G11B 7/00
[52] U.S. Cl. .................................... 369/44.29; 369/44.29; 369/44.26; 369/44.35
[58] Field of Search .............................. 369/44.26, 44.27, 369/44.29, 44.35, 44.41, 54, 58, 44.28

[56] References Cited

U.S. PATENT DOCUMENTS

| | | |
|---|---|---|
| 5,268,883 | 12/1993 | Yamaguchi et al. . |
| 5,363,358 | 11/1994 | Yanagawa et al. . |
| 5,408,452 | 4/1995 | Sakemoto et al. ..................... 369/44.26 |
| 5,663,946 | 9/1997 | Ohtomo ..................................... 369/58 |
| 5,671,199 | 9/1997 | Nishikawa ........................... 369/44.26 |
| 5,805,542 | 9/1998 | Soma et al. .......................... 369/44.26 |
| 5,859,819 | 1/1999 | Miyabe et al. ....................... 369/44.41 |

FOREIGN PATENT DOCUMENTS

| | | |
|---|---|---|
| 50-99561 | 8/1975 | Japan . |
| 52-80802 | 7/1977 | Japan . |
| 59-18771 | 4/1984 | Japan . |
| 64-27036 | 1/1989 | Japan . |
| 3-130972 | 6/1991 | Japan . |
| 4-47897 | 8/1992 | Japan . |
| 8-87760 | 4/1996 | Japan . |

Primary Examiner—Thang V. Tran
Attorney, Agent, or Firm—Michael K. Kelly; Snell & Wilmer L.L.P.

[57] ABSTRACT

An optical information apparatus for performing at least one of a reproduction operation and a recording operation for an information medium by radiating a light beam on the information medium is provided, wherein the information medium has a first region, including a first track having information recorded thereon in the form of convex and concave pits, and a second region, including a second track formed in the form of convex and concave guide grooves. The apparatus includes: first tracking error detection component for detecting an error in position between the light beam and the first track in the first region; second tracking error detection component for detecting an error in position between the light beam and the second track in the second region; tracking control component for performing tracking control for locating the light beam on a predetermined track; determination component for determining whether the light beam is located in the first region or the second region; and switching component for selecting either one of an output signal of the first tracking error detection component or an output signal of the second tracking error detection component based on a result of determination by the determination component, and sending the selected output signal to the tracking control component.

9 Claims, 13 Drawing Sheets

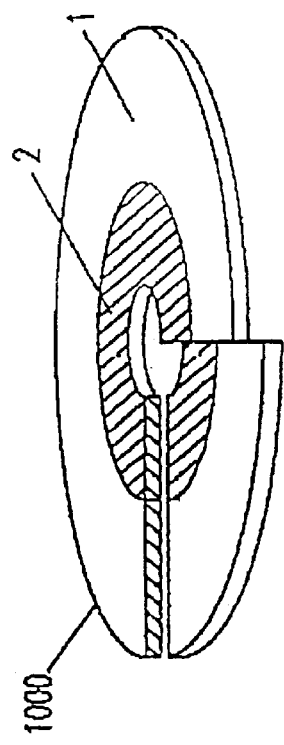
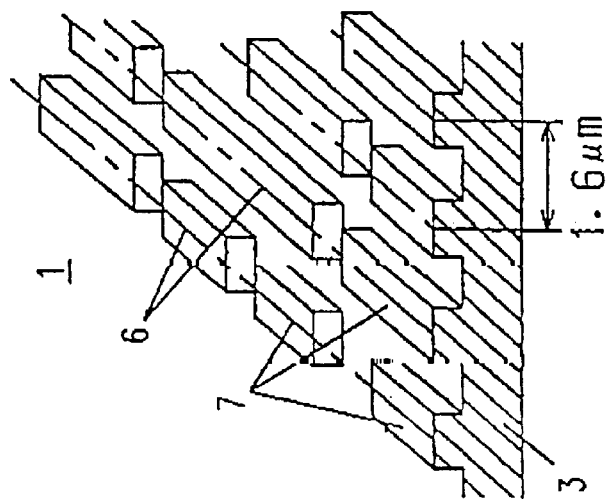
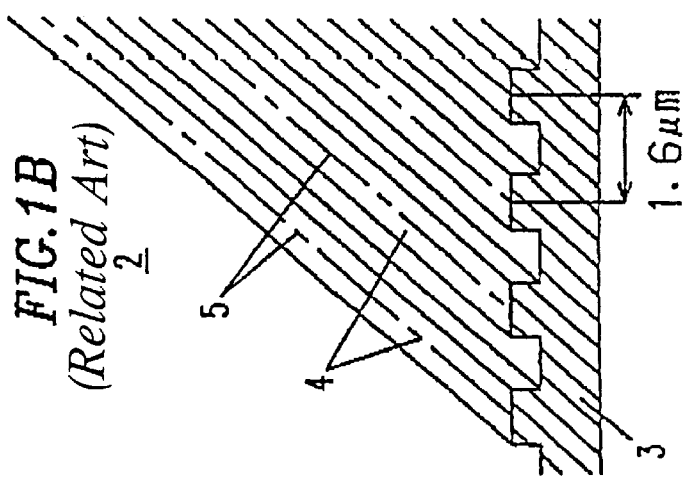

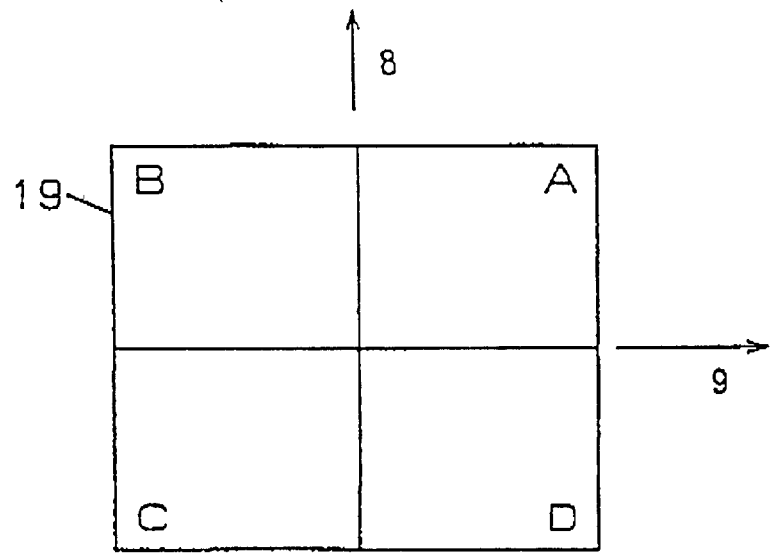
FIG. 3 (Related Art)
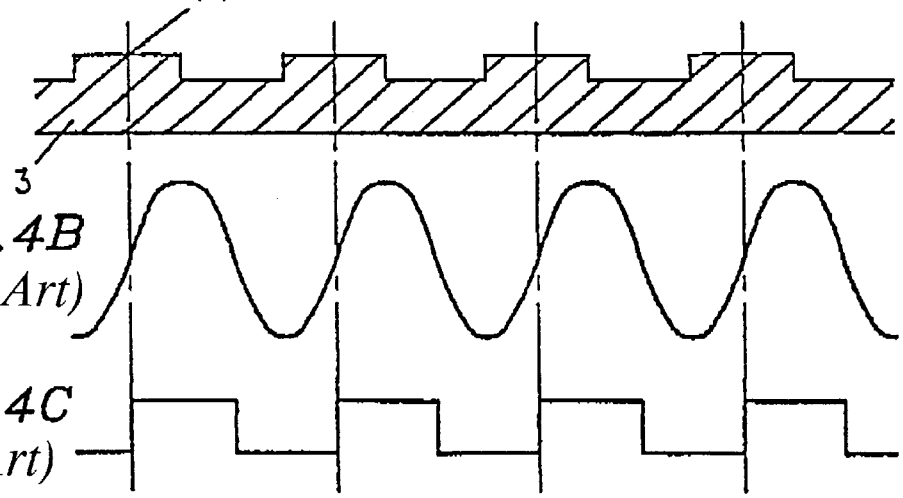
FIG. 4A (Related Art)
FIG. 4B (Related Art)
FIG. 4C (Related Art)

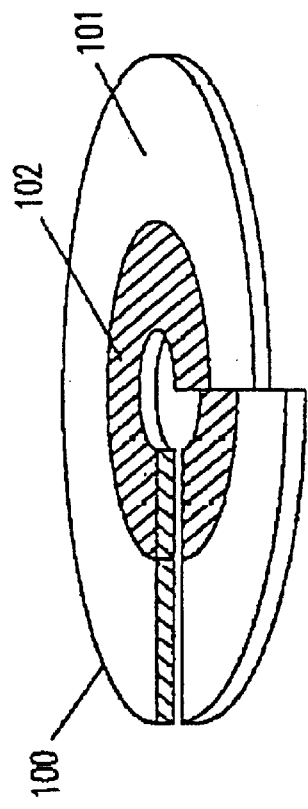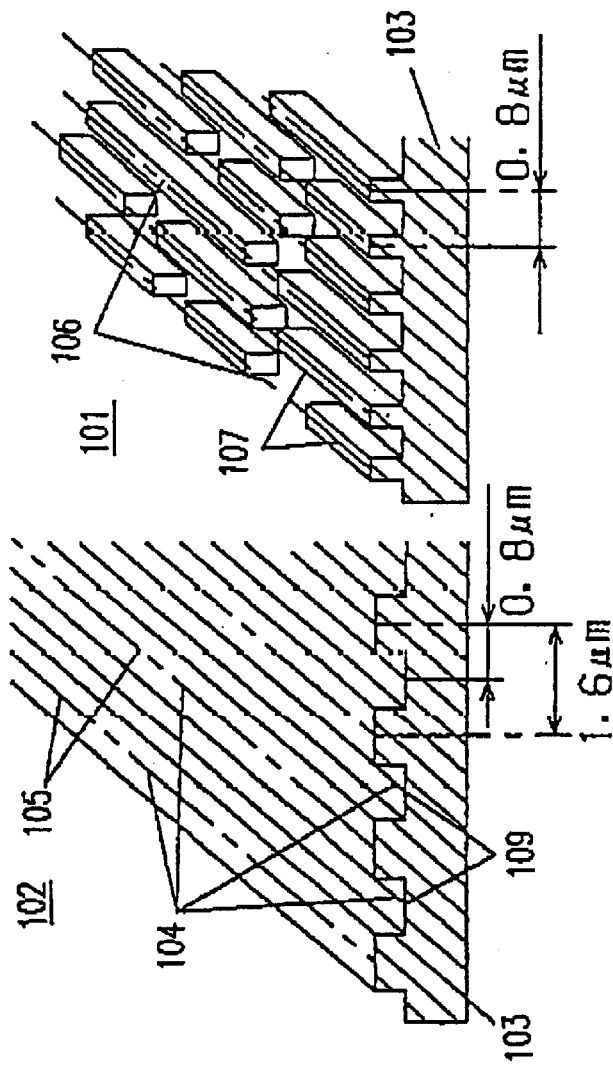

OPTICAL INFORMATION APPARATUS EMPLOYING TWO DIFFERENT TRACKING ERROR SIGNALS BASED ON REGIONS ON INFORMATION MEDIUM

BACKGROUND OF THE INVENTION

1. Field of the Invention

The present invention relates to an optical information apparatus capable of performing stable and highly accurate tracking control and tracking search for an optical information medium having a first region including tracks in which information is recorded in the form of convex and concave pits and a second region including tracks defined as convex and concave guide grooves.

2. Description of the Related Art

Optical information apparatuses (hereinafter also referred to as an "optical disk apparatus") for recording/reproducing signals on an information medium in the form of a rotating disk (hereinafter also referred to as an "optical disk") by converging or radiating a light beam from a light source (e.g., a semiconductor laser) are known. Such an optical disk apparatus performs the signal reproduction function by radiating a relatively weak light beam of a constant light amount on an optical disk so as to detect light reflected from the optical disk, where the intensity of the reflected light has been modulated by the optical disk. The recording of signals on the optical disk is performed by radiating a light beam whose light amount has been modulated in accordance with the signals to be recorded (hereinafter referred to as "recording signals") on an optical disk, thereby writing information on a film of recording material provided on the optical disk. Such a recording/reproduction technique is disclosed, for example, in Japanese Laid-open patent Publication No.52-80802.

An optical disk is typically fabricated by forming a film of material capable of optical recording/reproduction on the surface of a substrate having convex and concave tracks in a concentric arrangement by deposition or other techniques. FIG. 1A is a schematic perspective view showing the structure of an optical disk 1000 fabricated by such a method.

The optical disk 1000 includes two discrete doughnut-like regions along the radius direction of the disk, namely, a region 1, and a region 2, each including a plurality of tracks. FIGS. 1B and 1C are schematic magnified views of the optical disk 1000 at cross sections along the radius direction in the regions 2 and 1, respectively.

The region 2 shown in FIG. 1B, which includes a film of recording material formed thereon, defines a random access memory (RAM) region 2 where information can be recorded or reproduced in an optical manner. The RAM region 2 includes tracks 4 in the form of a continuous guide groove 5 (defining convex and concave portions) at a predetermined interval on the surface of a substrate 3. The tracks 4 have an optical depth substantially equal to λ/8 (where λ represents the wavelength of an optical beam used during recording/ reproduction). The tracks 4 in the RAM region 2 are typically formed at intervals of about 1.6 μm.

The region 1 shown in FIG. 1C includes tracks 6 in the form of discontinuous grooves (defined by pits 7) formed on the substrate 3. The region 1 defines a read only memory (ROM) region 1 wherein information is previously recorded in the form of the pits 7. The tracks 6 in the ROM region 1 are also typically formed at intervals of about 1.6 μm.

FIG. 2 is a block diagram showing the structure of an optical disk apparatus capable of searching for the tracks 4 and 6 on the optical disk 1000.

The structure shown in FIG. 2 includes a laser 11, a coupling lens 12, a polarizing beam splitter 13, a ¼ wavelength plate 14, a total reflection mirror 15, a converging lens 16, an actuator 20, a detection lens 17, a cylindrical lens 18, and an optical detector 19, which are mounted on a conveyance base 10. The base 10 and the respective component elements mounted thereon are moved together along the radius direction (i.e., the "tracking direction) of the optical disk 1000 by a coarse motor 26.

Light generated by the laser 11 is colliminated by the coupling lens 12, led through the polarizing beam splitter 13 and the ¼ wavelength plate 14, diverted by the total reflection mirror 15, and converged onto the optical disk 1000 by the converging lens 16. The light reflected from the optical disk 1000 goes back through the converging lens 16, the total reflection mirror 15, and the ¼ wavelength plate 14, reflected by the polarizing beam splitter 13 so as to be led through the detection lens 17 and the cylindrical lens 18 and illuminate the optical detector 19 (having four discrete portions).

The converging lens 16 is attached to the actuator 20 via an elastic member, such as wire, so as to be movable along both a direction perpendicular to the surface of the optical disk 1000 (i.e., the focus direction) and the aforementioned tracking direction (i.e., the radius direction of the optical disk 1000). A focus coil and a tracking coil (neither of which is shown) are disposed on a fixed portion of the actuator 20. A permanent magnet (not shown) is disposed on a movable portion of the actuator 20 including the converging lens 16. The converging lens 16 travels along the focus direction due to electromagnetic force arising from a current flowing through the focus coil, and travels along the tracking direction due to electromagnetic force arising from a current flowing through the tracking coil.

FIG. 3 is a plan view showing the optical detector 19. The optical detector 19 includes four discrete light-sensitive portions A, B, C, and D disposed with respect to the tracking direction 8 and a longitudinal direction 9 of tracks, as shown in FIG. 3.

The current which the light-sensitive portion A outputs based on the amount of light received thereby is converted into a voltage by an I/V convertor 22 shown in FIG. 2. Similarly, the currents which the respective light-sensitive portions B, C, and D output based on their respectively received light amounts are converted into voltages by I/V convertors 23, 24, and 25 shown in FIG. 2.

First, focus control, which is performed for ensuring that the converged spot of the light beam is positioned on a recording surface of the optical disk 1000, will be described.

The difference between a signal obtained by adding the output signals of the I/V convertors 22 and 24 by means of an adder 31 and a signal obtained by adding the output signals of the I/V convertors 23 and 25 by means of an adder 32 is subjected to an operation by a differential amplifier 35, whereby a focus error signal (hereinafter referred to as "FES") indicating the state of light convergence on the information surface (i.e., the recording surface) of the optical disk 1000 is obtained. Such a detection method, generally called the astigmatic method, is disclosed in Japanese Laid-Open Patent Publication No.50-99561, for example.

The FES is supplied to the focus coil via a phase compensation filter 60, a switch 62, and a power amplifier 68. Thus, the converging lens 16 is controlled in accordance with the FES so that the converged spot of the light beam is positioned on the recording face of the optical disk 1000.

Next, tracking control, which is performed for positioning the light beam on the track center in the RAM region 2 where the tracks are formed as the guide grooves, will be described.

The difference between a signal obtained by adding the output signals of the I/V convertors 22 and 23 by means of an adder 33 and a signal obtained by adding the output signals of the I/V convertors 24 and 25 by means of an adder 34 is subjected to an operation by a differential amplifier 36, whereby a tracking error signal (hereinafter referred to as "TES") indicating the positional relationship between the light beam and a track on the optical disk 1000 is obtained. Specifically, a TES is detected based on the difference between a signal obtained by adding the outputs from the light-sensitive portions A and B of the optical detector 19 and a signal obtained by adding the outputs from the light-sensitive portions C and D of the optical detector 19. Such a detection method, generally called the push-pull method, is disclosed in Japanese Patent Publication for Opposition No.59-18771, for example. By the push-pull method, a tracking error is detected based on the facts that the reflected light of the light beam takes a symmetrical intensity distribution (along the right-left direction) when the light beam is on the track center or when the light beam is positioned between the adjacent tracks, and that the reflected light of the light beam takes a correspondingly asymmetrical intensity distribution (along the right-left direction) when the light beam is off the track center.

The TES is supplied to the tracking coil via a low-pass filter 43, a phase compensation filter 61, a switch 63, and a power amplifier 69. The output signal from the switch 63 is supplied to the coarse motor 26 via the adder 67 and the power amplifier 70. Thus, the converging lens 16 and the base 10 are tracking-controlled so as to locate the light beam on the track center.

Next, the tracking control within the ROM region 1 where the tracks are formed as a pit array will be described.

In the ROM region 1, the pits 7 are formed so as to define discontinuous grooves. In subregions of the ROM region 1 where the pits 7 are present, a TES can be obtained by the above-described method, as is possible in the RAM region 2. However, in any subregion of the ROM region 1 where no pits are present, a TES cannot be obtained by the above-described method. Consequently, the TES in the ROM region 1 is a signal which is modulated by the pits 7. Since the frequency of modulation due to the pits 7 is sufficiently higher than the tracking control band, a tracking can be fairly obtained by eliminating the high frequency components by means of the low-pass filter 43.

Next, a method for searching for a desired track will be described.

With reference to the structure shown in FIG. 2, a microcomputer 80 closes the switches 62 and 63 to perform focus control and tracking control so as to locate the light beam on a track on the optical disk 1000. On each track of the optical disk 1000, an address for identifying the position of the track is recorded in the form of pits. An adder 41 adds the output signals of the adders 33 and 34 and outputs a signal corresponding to the total amount of light obtained at the light-sensitive portions A, B, C, and D of the optical detector 19 to an address regenerator 42. The address regenerator 42 digitizes its input so as to read the address At, which is output to the microcomputer 80.

Once the address At of the desired track is input to the microcomputer 80, the microcomputer 80 obtains a current address A0 from the address regenerator 42 to calculate the number Nt (=At−A0) of tracks between the current track and the desired track. The microcomputer 80 also clears the count of a pulse counter 54. Thereafter, the microcomputer 80 opens the switch 63 to inactivate tracking control. Concurrently, the microcomputer 80 sets a number corresponding to the number Nt (of tracks between the current track and the desired track) at a D/A convertor 83. The output signal of the D/A convertor 83 is supplied to the coarse motor 26 via the adder 67 and the power amplifier 70, and the coarse motor 26 moves the base 10 toward the desired track based on the supplied signal.

The TES is input to a comparator 53 via the low-pass filter 43. As the base 10 moves toward the desired track, the comparator 53 generates a signal obtained by digitizing the TES into a signal having a high level and a low level. The digitized signal is supplied to the pulse counter 54.

FIG. 4A is a cross-sectional view of an optical disk 1000 along its radius direction, showing a track 4(6) on the substrate 3 of the optical disk. FIGS. 4B and 4C show the TES and the output signal of the comparator 53, respectively, obtained when the light beam travels across the track 4(6). As seen from FIG. 4C, the output signal of the comparator 53 goes high or low every time the light beam travels a distance equal to ½ of the track interval.

The pulse counter 54 counts the rising edge of the output signal of the comparator 53. The microcomputer 80 reads the count of the pulse counter 54, thereby detecting the number N1 of tracks the light beam has travelled across after the track search was begun. Thereafter, the microcomputer 80 calculates the value Nt−N1 and sets a value which is in accordance with the calculated value at the D/A convertor 83, thereby driving the coarse motor 26.

When the number Nt−N1 of tracks to be crossed before reaching the desired track becomes zero, the microcomputer 80 closes the switch 63 to activate track control. The microcomputer 80 reads the address of the track at which the light beam is located, and upon determining that the address is equal to the known address of the desired track, ends the search operation. If the microcomputer 80 determines that the address is not equal to the address of the desired track, the above-described search operation is repeated until the desired track is reached.

In the above-described conventional optical information (optical disk apparatus), the TES in the ROM region 1 becomes smaller in amplitude than the TES in the RAM region 2 because no TES is in fact obtained in the flat subregions of the ROM region 1 where no pits are present. Therefore, the tracking control for the ROM region 1 is relatively instable.

There may also be a further problem as follows: In the case where the track pitch is large, as shown in FIG. 5A, the converged spot 200 of the light beam is located so as to correspond to one row of track 6 (pit 7). However, some optical disks may have a smaller track pitch in order to meet the demand for increased recording density. By applying the tracking control technique to such a narrow-pitched optical disk by the above-mentioned push-pull method using a semiconductor laser of the same wavelength as a light source (since it is not practical to employ different semiconductor lasers as a light source depending on the kind of disks), the diameter of the converged spot 200 of the light beam becomes excessively large relative to the width of one row of track 6' (pit 7'), as shown in FIG. 5B. Consequently, an adjacent track 6' (pit 7') is inevitably radiated by the same light beam. This results in some reflection of light from the adjacent track 6' (pit 7'), which in turn may cause an error in the TES. As a result, it becomes difficult to perform stable tracking control and/or a tracking search process at a desired accuracy.

SUMMARY OF THE INVENTION

According to one aspect of the invention, an optical information apparatus for performing at least one of a reproduction operation and a recording operation for an information medium by radiating a light beam on the information medium is provided, wherein the information medium has a first region, including a first track having information recorded thereon in the form of convex and concave pits, and a second region, including a second track formed in the form of convex and concave guide grooves. The apparatus includes: first tracking error detection means for detecting an error in position between the light beam and the first track in the first region; second tracking error detection means for detecting an error in position between the light beam and the second track in the second region; tracking control means for performing tracking control for locating the light beam on a predetermined track; determination means for determining whether the light beam is located in the first region or the second region; and switching means for selecting either one of an output signal of the first tracking error detection means or an output signal of the second tracking error detection means based on a result of determination by the determination means, and sending the selected output signal to the tracking control means.

In one embodiment, the determination means performs the determination based on an amplitude level of the output signal of the first tracking error detection means.

In one embodiment, the determination means performs the determination based on an amplitude level of the output signal of the second tracking error detection means.

In one embodiment, the first region is a read only memory region and the second region is a random access memory region.

In one embodiment, the first tracking error detection means generates the output signal in accordance with a phase difference method, and the second tracking error detection means generates the output signal in accordance with a push-pull method.

According to another aspect of the invention, an optical information apparatus for performing at least one of a reproduction operation and a recording operation for an information medium by radiating a light beam on the information medium is provided, wherein the information medium has a first region, including a first track having information recorded thereon in the form of convex and concave pits, and a second region, including a second track formed in the form of convex and concave guide grooves. The apparatus includes: first tracking error detection means for detecting an error in position between the light beam and the first track in the first region; second tracking error detection means for detecting an error in position between the light beam and the second track in the second region; and search means for measuring a travel condition of the light beam over the information medium based on at least one of an output signal of the first tracking error detection means and an output signal of the second tracking error detection means, and searching for a desired track on the information medium based on a result of measurement. The search means detects whether or not the light beam has passed a boundary between the first region and the second region, and based on a result of detection, switches between the output signal of the first tracking error detection means and the output signal of the second tracking error detection means.

In one embodiment, the search means measures an amount of travel of the light beam over the information medium based on one of the output signal of the first tracking error detection means and the output signal of the second tracking error detection means.

In one embodiment, the search means measures a velocity of travel of the light beam with respect to the tracks based on one of the output signal of the first tracking error detection means and the output signal of the second tracking error detection means.

In one embodiment, the search means detects passage of the boundary based on the output signal of the first tracking error detection means.

In one embodiment, the search means detects passage of the boundary based on the output signal of the second tracking error detection means.

In one embodiment, the search means detects passage of the boundary based on the output signal of the second tracking error detection means during search from the second region toward the first region, and based on the output signal of the first tracking error detection means during search from the first region toward the second region.

In one embodiment, the first region is a read only memory region and the second region is a random access memory region.

In one embodiment, the first tracking error detection means generates the output signal in accordance with a phase difference method, and the second tracking error detection means generates the output signal in accordance with a push-pull method.

According to still another aspect of the invention, an optical information apparatus for performing at least one of a reproduction operation and a recording operation for an information medium by radiating a light beam on the information medium is provided, wherein the information medium has a first region, including a first track having information recorded thereon in the form of convex and concave pits, and a second region, including a second track formed in the form of convex and concave guide grooves. The apparatus includes: first tracking error detection means for detecting an error in position between the light beam and the first track in the first region; second tracking error detection means for detecting an error in position between the light beam and the second track in the second region; and search means for measuring a travel condition of the light beam over the information medium based on at least one of an output signal of the first tracking error detection means and an output signal of the second tracking error detection means, end searching for a desired track on the information medium based on a result of measurement. The search means determines whether the light beam is located in the first region or the second region, and, based on a result of determination, performs measurement based on the output signal of the first tracking error detection means in the first region and measurement based on the output signal of the second tracking error detection means in the second region.

In one embodiment, the search means measures an amount of travel of the light beam over the information medium.

In one embodiment, the search means measures a velocity of travel of the light beam with respect to the tracks.

In one embodiment, the search means determines the location of the light beam based on an amplitude of the output signal of the first tracking error detection means.

In one embodiment, the search means determines the location of the light beam based on an amplitude of the output signal of the second tracking error detection means.

In one embodiment, the search means determines the location of the light beam based on an amplitude of the output signal of the second tracking error detection means during search from the second region toward the first region, and based on an amplitude of the output signal of the first tracking error detection means during search from the first region toward the second region.

In one embodiment, the first region is a read only memory region and the second region is a random access memory region.

In one embodiment, the first tracking error detection means generates the output signal in accordance with a phase difference method, and the second tracking error detection means generates the output signal in accordance with a push-pull method.

Thus, the present invention described herein makes possible the advantage of providing an optical information apparatus capable of performing stable and highly accurate tracking control and track search for an information medium having a read only memory (ROM) region and a random access memory (RAM) region.

This and other advantages of the present invention will become apparent to those skilled in the art upon reading and understanding the following detailed description with reference to the accompanying figures.

BRIEF DESCRIPTION OF THE DRAWINGS

FIG. 1A is a schematic perspective view showing an exemplary optical disk.

FIGS. 1B and 1C are schematic magnified views of the optical disk shown in FIG. 1A at cross sections along the radius direction in a RAM region and a ROM region thereof, respectively.

FIG. 3 is a plan view showing an typical optical detector.

FIG. 4A is a cross-sectional view of the optical disk shown in FIG. 1A along its radius direction.

FIGS. 4B and 4C show the tracking error signal and the track crossing signal obtained from the optical disk configuration shown in FIG. 4A.

FIG. 6A is a schematic perspective view showing an exemplary optical disk having a narrow track pitch.

FIGS. 6B and 6C are schematic magnified views of the optical disk shown in FIG. 6A at cross sections along the radius direction in a RAM region and a ROM region thereof, respectively.

DESCRIPTION OF THE PREFERRED EMBODIMENTS

EXAMPLE 1

Figure 2:
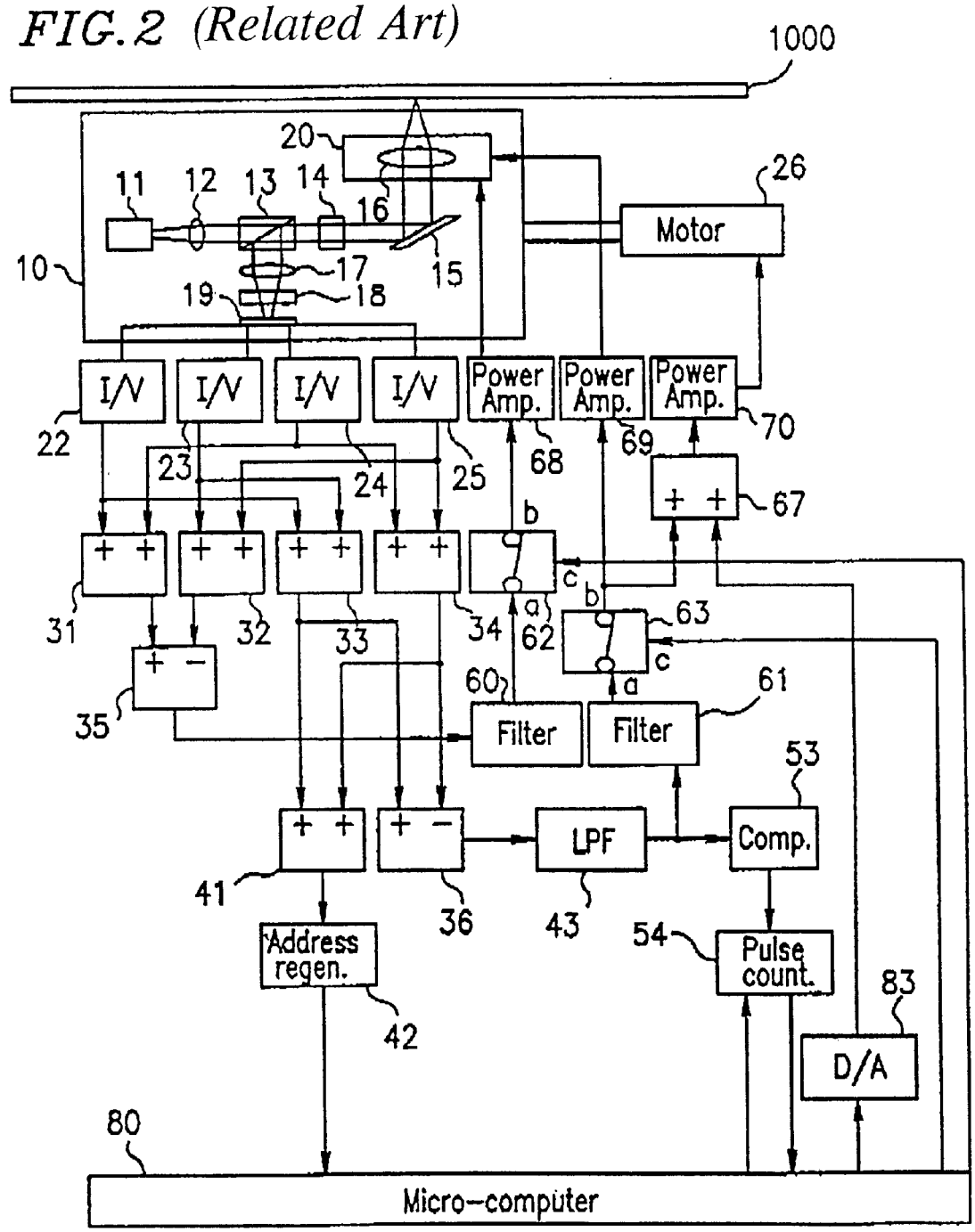
FIG. 2 is a block diagram showing the structure of a conventional optical disk apparatus.
Figure 5A:
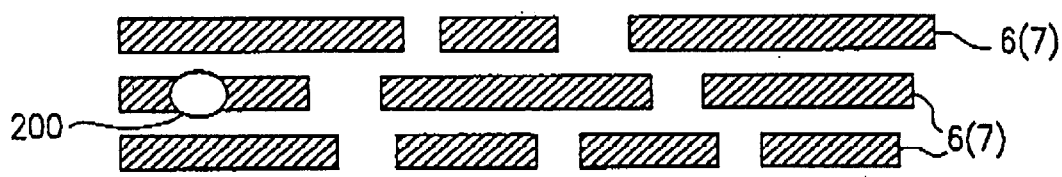
FIGS. 5A and 5B are schematic plan views respectively illustrating the positional relationship between the pits and the light beams with respect to two kinds of the optical disks having different track pitches.
Figure 5B:
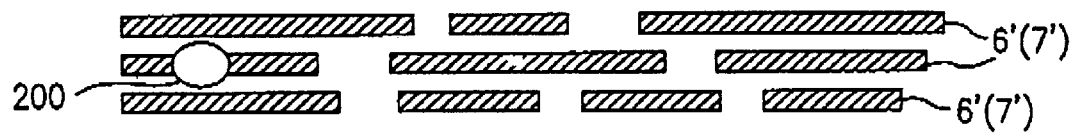

FIG. 6A is a schematic perspective view showing an optical information medium (optical disk) 100 on which the optical information apparatus (optical disk apparatus) of the present invention performs recording/reproduction operations.

The optical disk 100 includes an doughnut-like ROM region 101 and a doughnut-like RAM region 102, each including a plurality of tracks. FIGS. 6B and 6C are schematic magnified views of the optical disk 100 at cross sections along the radius direction in the RAM region 102 and the ROM region 101, respectively.

In the RAM region 102 shown in FIG. 6B, convex groove tracks 105 and land tracks 109 interposed between groove tracks 105, formed on a substrate 103, are both utilized as tracks 104 for recording/reproduction of information. Accordingly, in the RAM region 102 of the optical disk 100, the interval of the tracks 104 carrying information is half of that of the conventional optical disk 1000 previously described. Thus, the optical disk 100 has a track density which is twice the track density of the conventional optical disk 1000. However, since the groove tracks 105 are disposed at the same interval of 1.6 µm as that of the optical disk 1000, a TES can be obtained by the push-pull method as in the case of the optical disk 1000. When performing tracking control for a land track 109, the polarity of the TES is inverted to the opposite polarity of that of the TES for a groove track 105.

On the other hand, in the ROM region 101 shown in FIG. 6C, the tracks 106 are in the form of discontinuous grooves (defined by pits 107) formed on the substrate 103. The interval of the tracks 106 (pits 107) in the ROM region 101 is prescribed at about 0.8 µm, which is half of that of the conventional optical disk 1000, in order to obtain a doubled recording density.

Figure 7:
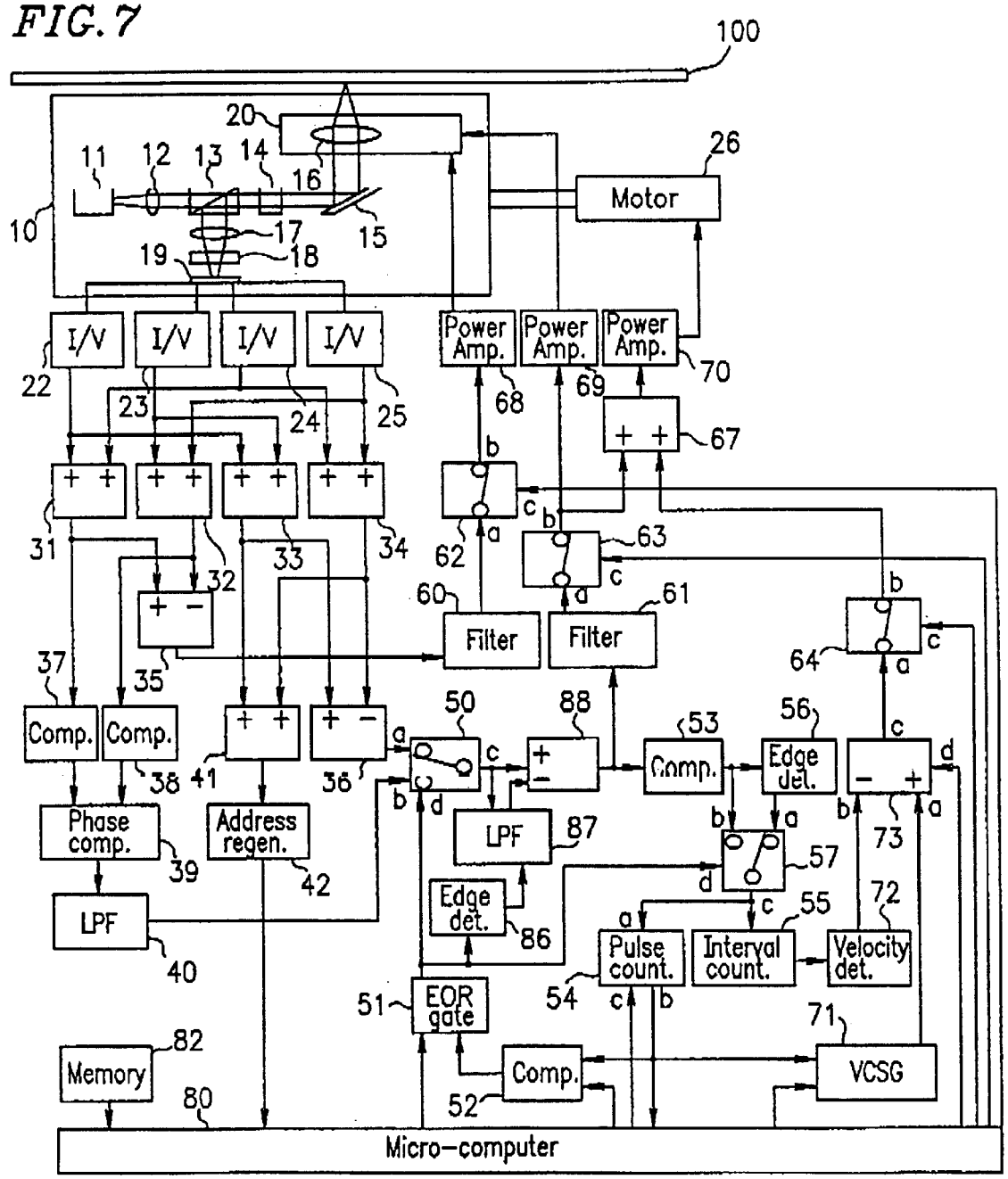
FIG. 7 is a block diagram showing the structure of an optical disk apparatus in accordance with a first embodiment of the present invention.

FIG. 7 is a block diagram showing the structure of an optical information apparatus (optical disk apparatus) capable of searching for the tracks 104 and 106 on the optical disk 100 as described above. Component elements which correspond to those of the conventional structure that were described with reference to FIG. 2 are indicated by like numerals, and the descriptions thereof are omitted.

In the optical disk apparatus shown in FIG. 7, tracking control for the RAM region 102 is performed by the push-pull method. Specifically, the TES as the output signal of a differential amplifier 36 is supplied to a tracking coil via a switch 50, a phase compensation filter 61, a switch 63, and a power amplifier 69. The output signal from the switch 63 is supplied to a coarse motor 26 via an adder 67 and a power amplifier 70. Thus, a converging lens 16 and a conveyance base 10 are tracking-controlled so as to locate the light beam on the track center.

On the other hand, the tracking control for the ROM region 101 is performed by a phase difference method such as the technique disclosed in Japanese Patent Publication for Opposition No.4-47897. Specifically, the output signals of adders 31 and 32 are digitized by comparators 37 and 38, respectively, and the phases of the resultant signals are compared by a phase comparator 39. The high-frequency component of the output signal of the phase comparator 39 is eliminated by a low-pass filter 40, whereby a TES is obtained. The TES, obtained as the output signal of the low-pass filter 40, is supplied to the coarse motor 26 and the tracking coil via the switch 50. By the phase difference method, a TES is detected by utilizing the fact that the reflected light on an optical detector 19 provides different intensity distributions, depending on the position along the tracking direction, as the light beam travels past the pits.

A TES obtained by the push-pull method has a smaller amplitude in tracks defined by continuous guide grooves than in tracks defined by pits. Moreover, the amplitude of such a TES becomes extremely small as the track pitch (i.e., intervals between tracks) is decreased. On the other hand, a TES cannot be obtained by the phase difference method in tracks defined by continuous guide grooves, but a TES obtained by the phase difference method in tracks defined by pits is advantageous in that it does not see extreme deterioration as the track pitch is decreased. Therefore, unlike the push-pull method, the phase difference method provides an excellent TES even if the track pitch in the ROM region 101 is reduced to 0.8 µm from 1.6 µm.

Now, the TES obtained by the push-pull method and the TES obtained by the phase difference method will be compared with reference to FIGS. 8A to 8F.

Figure 8:
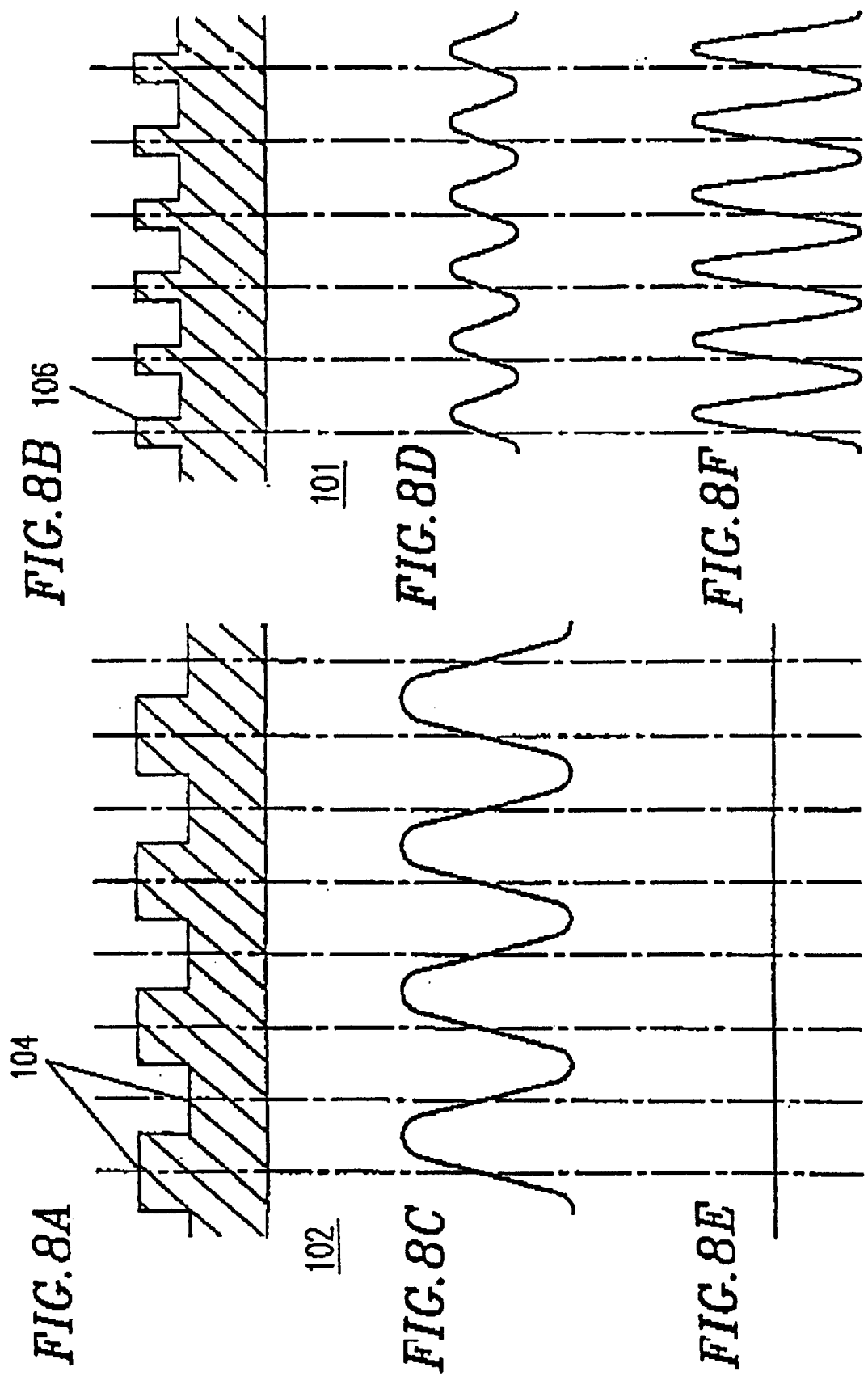
FIGS. 8A and 8B are schematic magnified views of the optical disk shown in FIG. 6A at cross sections along the radius direction in a RAM region and a ROM region thereof, respectively.
FIGS. 8C and 8D are diagrams illustrating a tracking error signal according to the push-pull method for the RAM region and the ROM region, respectively.
FIGS. 8E and 8F are diagrams illustrating a tracking error signal according to the phase difference method for the RAM region and the ROM region, respectively.

FIGS. 8A and 8B are schematic enlarged cross-sectional views showing cross sections of the optical disk 100 along the radius direction in the RAM region 102 and the ROM region 101, respectively. FIGS. 8C and 8D are diagrams illustrating a plotted TES output from the differential amplifier 36 according to the push-pull method for the RAM region 102 and the ROM region 101, respectively, where the location of the light beam at any given time corresponds to that on the horizontal axis of FIGS. 8A and 8B. FIGS. 8E and 8F are diagrams illustrating a plotted TES output from the low-pass filter 40 according to the phase difference method for the RAM region 102 and the ROM region 101, respectively, where the location of the light beam at any given time corresponds to that on the horizontal axis of FIGS. 8A and 8B.

As will be apparent from these figures, the TES obtained by the push-pull method decreases in amplitude in the ROM region 101, while it is detectable in the RAM region 102. On the other hand, the TES obtained by the phase difference method is hardly detected in the RAM region 102, while it is detectable in the ROM region 101.

The switch 50 included in the structure of FIG. 7 is a switch for selecting, under the control of an EOR (exclusive OR) gate 51, either the TES obtained from the differential amplifier 36 by the push-pull method or the TES obtained from the low-pass filter 40 by the phase difference method.

Specifically, during the active period of tracking control, the count of a pulse counter 54, which was previously reset by a microcomputer 80, remains at zero. The microcomputer 80 has also set a value greater than zero at a comparator 52. The comparator 52 compares the value of the pulse counter 54 and the value set by the microcomputer 80 so as to output to the EOR gate 51 a high level signal in the case where the former value is equal to or greater than the latter value and output a low level signal in the case where the latter value is greater than the former value. Accordingly, the comparator 52 outputs a low level signal during tracking control. Responsive to a high level signal issued by the microcomputer 80 to the EOR gate 51 in order to activate tracking control for locating the light beam on a track in the RAM region 102, the EOR gate 51 sends a high level signal to the switch 50, which accordingly operates so as to couple the output signal of the differential amplifier 36 to the phase compensation filter 61. Responsive to a low level signal issued by the microcomputer 80 to the EOR gate 51 in order to activate tracking control for locating the light beam on a track in the ROM region 101, the EOR gate 51 sends a low level signal to the switch 50, which accordingly operates so as to couple the output signal of the low-pass filter 40 to the phase compensation filter 61.

The signal sent from the microcomputer 80 to the switch 50 is also sent to an edge detector 86. The edge detector 86 detects a rising or falling edge of the signal from the microcomputer 80, and sends to a low-pass filter 87 a high level signal during a predetermined period of time after the detection and a low level signal during the remaining period of time. The TES as selected by the switch 50 is supplied to the low-pass filter 87 and a differential amplifier 88. The low-pass filter 87, which is a filter having a sufficiently large time constant to render the signal component derived by crossing the tracks negligible, filters the TES from the switch 50 and sends the filtered TES to the differential amplifier 88 if the signal from the edge detector 86 is at the high level. If the signal from the edge detector 86 is at the low level, the low-pass filter 87 holds the TES from the switch 50 and sends the TES to the differential amplifier 88. The differential amplifier 88 subtracts the signal from the low-pass filter 87 from the TES from the switch 50, and sends the resultant signal to the phase compensation filter 61 and a comparator 53.

Next, an operation by the optical information apparatus of the present invention, in the case where a light beam located on a track in the RAM region 102 is moved to a desired track in the ROM region 101 following a search for the desired track, will be described.

An address Ac indicating a boundary between the ROM region 101 and the RAM region 102 is stored in a memory 82. Once the address At of the desired track is input to the microcomputer 80, the microcomputer 80 obtains a current address A0 from the an address regenerator 42 to calculate the number Nt (=At−A0) of tracks between the current track and the desired track. The microcomputer 80 compares the boundary address Ac stored in the memory 82 and the desired track address At to detect that the desired track is in the ROM region 101, and calculates the number Nc (=Ac−A0) of tracks between the current track and the ROM region 101. Then the microcomputer 80 sets Nt (i.e., the number of tracks between the current track and the desired track) in a velocity command signal generator (hereinafter "VCSG") 71, and sets No (i.e., the number of tracks between the current track and the ROM region 101) in the comparator 52. Furthermore, the microcomputer 80 clears the count of the pulse counter 54. Thereafter, the microcomputer 80 opens the switch 63 to inactivate tracking control, sends a detection direction signal to a differential amplifier 73, and closes a switch 64.

The VCSG 71 generates a velocity command signal in accordance with Nt (i.e., the number of tracks between the current track and the desired track), which is supplied to the coarse motor 26 via the differential amplifier 73, the switch 64, the adder 67, and the power amplifier 70. The coarse motor 26 moves the base 10 toward the desired track based on the velocity command signal. Concurrently with the movement of the base 10, a TES derived by crossing the tracks (a TES by the push-pull method) is generated by the differential amplifier 36. The TES is input to the comparator 53 via the switch 50 to be digitized. An edge detector 56 generates pulses corresponding to the rising edge and the falling edge of the digitized signal, and sends the pulse signal to the pulse counter 54 and an interval counter 55 via a switch 57.

The pulse counter 54 counts the number Np of tracks crossed by the light beam since the search was begun by counting the rising edge of the input signal (i.e., increments the count corresponding to every detected rising edge). The number Np is sent to the VCSG 71, the comparator 52, and the microcomputer 80.

The VCSG 71 sequentially reads the counts (each indicating a number Np of tracks) of the pulse counter 54 to calculate values Nt−Np (hereinafter referred to as the "number of remaining tracks" to be crossed), and generates a velocity command signal which is in accordance with the resultant number of remaining tracks.

Figure 9:
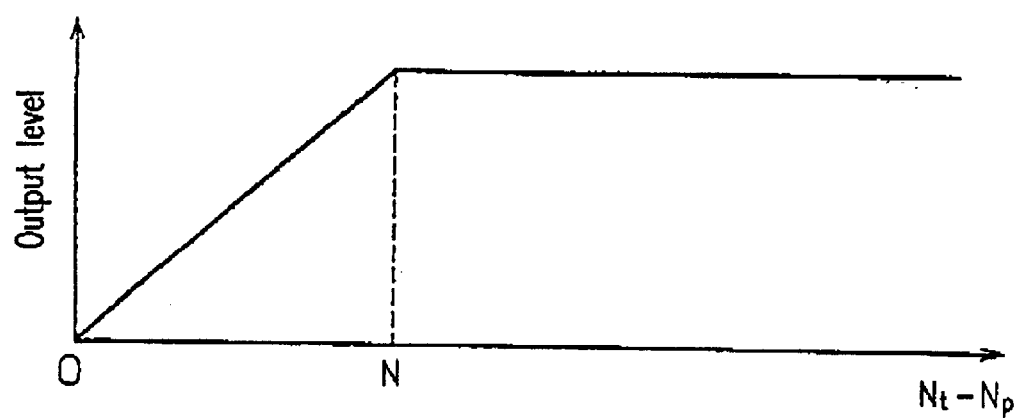
FIG. 9 shows the change in the velocity command signal (vertical axis) against the positional relationship between the light beam and the desired track (horizontal axis).

FIG. 9 shows the change in the output signal level of the VCSG 71 (vertical axis) against the number of remaining tracks (horizontal axis). When the number of remaining tracks (Nt−Np) is smaller than a predetermined value N, the VCSG 71 outputs a signal having a level which changes in accordance with the number of remaining tracks. When the number of remaining tracks (Nt−Np) is equal to or greater than the predetermined value N, the VCSG 71 outputs a signal at a constant level.

The interval counter 55 measures the time from one rising edge to the next rising edge of its input signal, and sends the measured value to a velocity detector 72. The velocity detector 72 calculates a travel velocity signal indicating the travelling velocity of the light beam based on the measured value of the interval counter 55, which is output to the differential amplifier 73. The differential amplifier 73 calculates the difference between the velocity command value issued from the VCSG 71 and the travel velocity signal from the velocity detector 72, and outputs the result as a differential signal so as to move the base 10 toward the desired track.

The differential amplifier 73 outputs a differential signal in accordance with the detection direction signal. For example, if the detection direction signal is at the high level, the differential amplifier 73 outputs the difference between the velocity command signal from the VCSG 71 and the travel velocity signal from the velocity detector 72 as a differential signal. If the detection direction signal is at the low level, the differential amplifier 73 inverts the polarity of the difference between the velocity command signal from the VCSG 71 and the travel velocity signal from the velocity detector 72 and outputs the inverted signal as a differential signal.

The comparator 52 compares the count of the pulse counter 54 and Nc (i.e., the number of tracks between the current track and the ROM region 101) so as to output to the EOR gate 51 a high level signal in the case where the former value is equal to or greater than the latter value and output a low level signal in the case where the latter value is greater than the former value. Accordingly, the comparator 52 outputs a high level signal to the EOR gate 51 once the count of the pulse counter 54 exceeds Nc (i.e., the number of tracks between the current track and the ROM region 101). The EOR gate 51 outputs a low level signal to the switches 50 and 57. Responsive to this low level signal, the switch 50 operates so as to couple the output signal of the low-pass filter 40 (i.e., a TES by the phase difference method) to the comparator 53, and the switch 57 operates so as to couple the output signal of the comparator 53 to the pulse counter 54 and the interval counter 55. The counting of the number of tracks that have been crossed by the light beam since the track search was begun can be continued by the pulse counter 54 counting the rising edge of the output signal of the comparator 53.

The microcomputer 80 reads the count of the pulse counter 54 and detects the number of tracks Np that have been crossed by the light beam since the track search was begun. Then, once the value Nt−Np (i.e., the number of remaining tracks) reaches zero, the microcomputer 80 opens the switch 64, resets the count of the pulse counter 54, and sends a low level signal to the EOR gate 51 to close the switch 63, thereby activating tracking control. Thereafter, tracking control is performed based on a TES obtained by the phase difference method. The microcomputer 80 reads the address of the track at which the light beam is located and upon determining that the address is equal to the known address of the desired track, ends the search operation. If the microcomputer 80 determines that the address is not equal to the address of the desired track, the above-described search operation is repeated until the desired track is reached.

In the above-described track search method, it is important to accurately count the number of tracks that have been crossed; otherwise, the TES may not be properly switched (i.e. from the TES by the push-pull method to the TES by the phase difference method) at the time when the light beam has reached the ROM region 101. In such cases, the amplitude of the TES in the ROM region 101 is reduced so that the number of tracks that have been crossed cannot be accurately counted, thereby prolonging the search time. In extreme cases, the base 10 may collide with a stopper (not shown). However, this problem can be avoided by prescribing the value which the microcomputer 80 sets in the comparator 52 at a value smaller than Nc (i.e., the number of tracks between the current track and the ROM region 101), so that the TES by the push-pull method is switched to the TES by the phase difference method at least some time before reaching the ROM region 101.

In addition, the TES by the push-pull method and the TES by the phase difference method contain detection offsets different from each other due to a difference in the detection methods. However, any disadvantages associated with this point can be avoided by performing an offset correction immediately after the switching of the tracking error signal.

The above points will be further described with reference to FIGS. 10A to 10I.

Figure 10A:
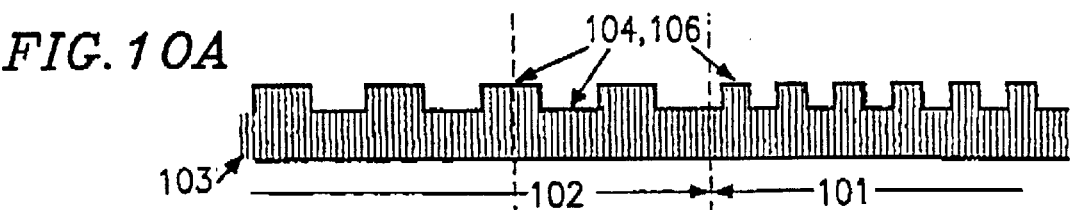
FIG. 10A is a schematic enlarged cross-sectional view showing a cross section of the optical disk shown in FIG. 6A along the radius direction thereof.
Figure 10B:
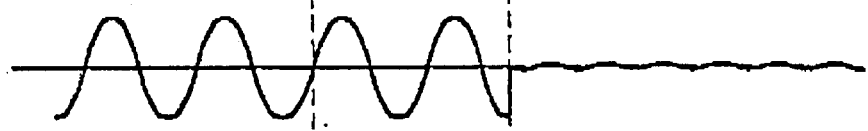
FIG. 10B is a diagram illustrating the tracking error signal according to the push-pull method.
Figure 10C:
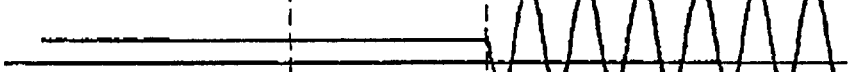
FIG. 10C is a diagram illustrating the tracking error signal according to the phase difference method.
Figure 10D:
FIG. 10D is a diagram illustrating the output of the differential amplifier 88.
Figure 10E:
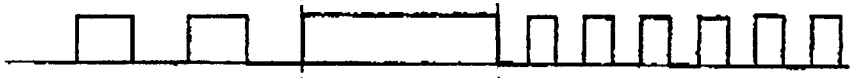
FIG. 10E is a diagram illustrating the track crossing signal which is output from the comparator 53.
Figure 10F:
FIG. 10F is a diagram illustrating the output of the edge detector 56.
Figure 10G:
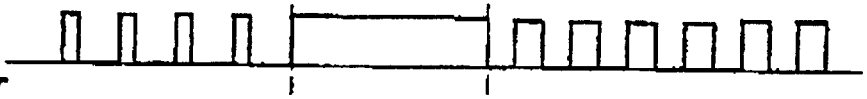
FIG. 10G is a diagram illustrating the output of the switch 57.
Figure 10H:
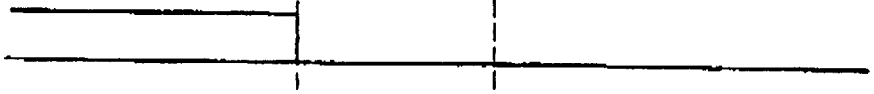
FIG. 10H is a diagram illustrating the output of the EOR gate 51.
Figure 10I:
FIG. 10I is a diagram illustrating the output from the edge detector 86 to the low-pass filter 87.

FIG. 10A is a schematic enlarged cross-sectional view showing a cross section of the optical disk 100 along the radius direction at a portion including the boundary between the RAM region 102 and the ROM region 101. FIG. 10B is a diagram illustrating the TES output from the differential amplifier 36 according to the push-pull method. FIG. 10C is a diagram illustrating the TES output from the low-pass filter 40 according to the phase difference method. FIG. 10D is a diagram illustrating the output of the differential amplifier 88. FIG. 10E is a diagram illustrating the track crossing signal which is output from the comparator 53. FIG. 10F is a diagram illustrating the output of the edge detector 56. FIG. 10G is a diagram illustrating the output of the switch 57. FIG. 10H is a diagram illustrating the output of the EOR gate 51. FIG. 10I is a diagram illustrating the output from the edge detector 86 to the low-pass filter 87.

The microcomputer 80 previously set in the comparator 53 a value obtained by subtracting a certain value (e.g., 3 in the example illustrated in FIG. 10A) from Nc (i.e., the actual number of tracks between the current track and the ROM region 101). Therefore, assuming that the count value of the pulse counter 54 includes no error, the TES is switched by the switch 50 at time t1 in FIG. 10D. Moreover, at time t1 shown in FIG. 10G, the signal to be coupled from the switch 57 to the pulse counter 54 is switched from the output signal of the edge detector 56 to the output signal of the comparator 53. However, since the light beam in this example is still located within the RAM region 102, no TES is being detected by the phase difference method, as shown in FIG. 10C. Therefore, no rising edge is detected in the track crossing signal, so that the count of the pulse counter 54 does not vary while the light beam is within the RAM region 102.

Thereafter, beginning at time t2, the light beam enters the ROM region 101, from which time the TES by the phase difference method is detected, the count of the pulse counter 54 being accordingly incremented.

It should be noted that the count of the pulse counter 54 indicating the number of tracks that have been crossed by the light beam after the track search was begun includes an error corresponding to the number of tracks passes between time t1 and time t2 (e.g., 3 in the illustrated example). However, such an error is not critical and is negligible in light of the large advantage of avoiding the collision of the base 10 into the stopper as described above.

Also in the example illustrated in FIGS. 10A to 10I, the TES by the push-pull method as shown in FIG. 10B includes no detection offset, while the TES by the phase difference method as shown in FIG. 10C includes some detection offset. As shown in FIG. 10I, the edge detector 86 outputs a high level signal only in a predetermined period of time after the switching (t1) of the TES. During the time period when the edge detector 86 thus outputs the high level signal, the low-pass filter 87 detects a DC component in the TES which is output from the switch 50. Thus, the DC component in the TES can be eliminated, realizing the offset correction.

During the time period when the edge detector 86 outputs the low level signal, the low-pass filter 87 holds its output value, thereby activating the tracking control. Thus, the correct DC component in the TES can be output from the low-pass filter 87 even when the DC component in the TES can not be measured.

Next, an operation by the optical information apparatus of the present invention, in the case where a light beam located on a track in the ROM region 101 is moved to a desired track in the RAM region 102 following a search for the desired track, will be described.

Once the address At of the desired track is input to the microcomputer 80, the microcomputer 80 obtains a current address A0 from the address regenerator 42 to calculate the number Nt (=At−A0) of tracks between the current track and the desired track. The microcomputer 80 compares the boundary address Ac stored in the memory 82 and the desired track address At to detect that the desired track is in the RAM region 102, and calculates the number Nc (=Ac−A0) of tracks between the current track and the RAM region 102. Then, the microcomputer 80 sets Nt (i.e., the number of tracks between the current track and the desired track) in the VCSG 71, and sets Nc (i.e., the number of tracks between the current track and the RAM region 102) in the comparator 52. Furthermore, the microcomputer 80 clears the count of the pulse counter 54. Thereafter, the microcomputer 80 opens the switch 63 to inactivate tracking control, sends a detection direction signal, indicating that a track search is to be performed toward the inner periphery of the optical disk, to the differential amplifier 73, and closes the switch 64.

Since the light beam is located in the ROM region 101 before beginning the track search in this exemplary operation, the microcomputer 80 outputs a low level signal to the EOR gate 51. Since the output signal of the comparator 52 before beginning the track search is at the low level, the output signal of the EOR gate 51 is also at the low level. Accordingly, the switch 50 selects the output signal from the low-pass filter 40 (i.e., a TES by the phase difference method) as its output, and the switch 57 selects the output signal from the comparator 53 as its output. Thus, tracking control and track search using the TES by the phase difference method are performed in the ROM region 101 while the count Np of the pulse counter 54 is smaller than Nc (i.e., the number of tracks between the current track and the RAM region 102).

Once the count of the pulse counter 54 exceeds Nc (i.e., the number of tracks between the current track and the RAM region 102) as the light beam reaches the RAM region 102, the comparator 52 outputs a high level signal to the EOR gate 51. The EOR gate 51 outputs a high level signal to the switches 50 and 57. Responsive to this high level signal, the switch 50 selects the output signal of the differential amplifier 36 (i.e., a TES by the push-pull method) as it output, and the switch 57 selects the output signal of the edge detector 56 as its output. Thereafter, tracking control and track search using the TES by the push-pull method are performed in the RAM region 102. As the count Np of the pulse counter 54 reaches Nt (i.e., the number of tracks between the current track and the desired track), the track search operation ends in a manner similar to ending the search operation as discussed above.

In the above description, the traveling velocity of the light beam with respect to the tracks is detected by measuring at the interval counter 55 the time from a rising edge to the next rising edge of an input signal, and deriving the velocity at the velocity detector 72 from a reciprocal of the measured time. Alternatively, the travelling velocity of the light beam may be detected by employing an F/V convertor for converting the frequency of the pulse signal output from the switch 57 into a voltage.

Although the RAM region 102 is located toward the inner periphery of the optical disk 100 whereas the ROM region 101 is located toward the outer periphery of the optical disk 100 in the above description, it will be appreciated that the relative positions of the regions 101 and 102 are not limited thereto. For example, the ROM region 101 may extend toward the inner periphery of the optical disk 100, while the RAM region 102 extends toward the inner periphery of the optical disk 100. Alternatively, the ROM region 101 and the RAM region 102 may be present in concentric circles that are divided into three or more subregions.

As described above, in accordance with the present example, it is determined whether the light beam is traveling in the ROM region 101 or the RAM region 102 during track search, based on the number of tracks that the light beam has crossed since the search was begun. As a result, the travel distance (an amount of travel) and the travelling velocity (a velocity of travel) are measured based on a TES according to the phase difference method while the light beam is travelling in the ROM region 101, and based on a TES according to the push-pull method while the light beam is travelling in the RAM region 102. Thus, the travel distance and the travelling velocity are measured accurately so as to enable a search for the desired track quickly and yet stably. Since tracking control based on a TES by the phase difference method is performed in the ROM region 101 and tracking control based on a TES by the push-pull method is performed in the RAM region 102, the initiation of tracking control can be securely and stably made.

It should be noted that, when tracking control methods are switched according to the principles of the present embodiment, the detection signal obtained by the phase difference method and the detection signal obtained by the push-pull method include mutually different detection offsets. Switching between detection methods depending on whether it is the RAM region 102 or the ROM region 101 requires appropriate correction of the difference between different detection offsets inherent to the different detection methods. However, such a correction can be made in a short period of time according to the present invention.

Specifically, in the case of switching from the phase difference method to the push-pull method, for example, a DC offset component of the TES by the push-pull method is measured by the low-pass filter 87 only for a certain period of time from immediately after the switching of the TES. This measured component may be subtracted from the TES actually obtained by the push-pull method, thereby correcting for the offset in a short period of time despite a change of the detection method during a search operation.

EXAMPLE 2

In the optical information apparatus according to the present example, during a track search operation for an optical disk 100 of the structure described in Example 1, it is determined whether the light beam is travelling in the ROM region or the RAM region by utilizing the change in the amplitude of a TES by the push-pull method.

Specifically, as seen from FIGS. 8C and 8D discussed above, the TES by the push-pull method has different amplitude levels depending on whether the light beam is located within the ROM region 101 or the RAM region 102. Therefore, the light beam can be determined to be travelling in the RAM region 102 in the case where the amplitude of the TES by the push-pull method exceeds a predetermined value, and travelling in the ROM region 101 in the case where the amplitude of the TES by the push-pull method is smaller than the predetermined value.

Figure 11:
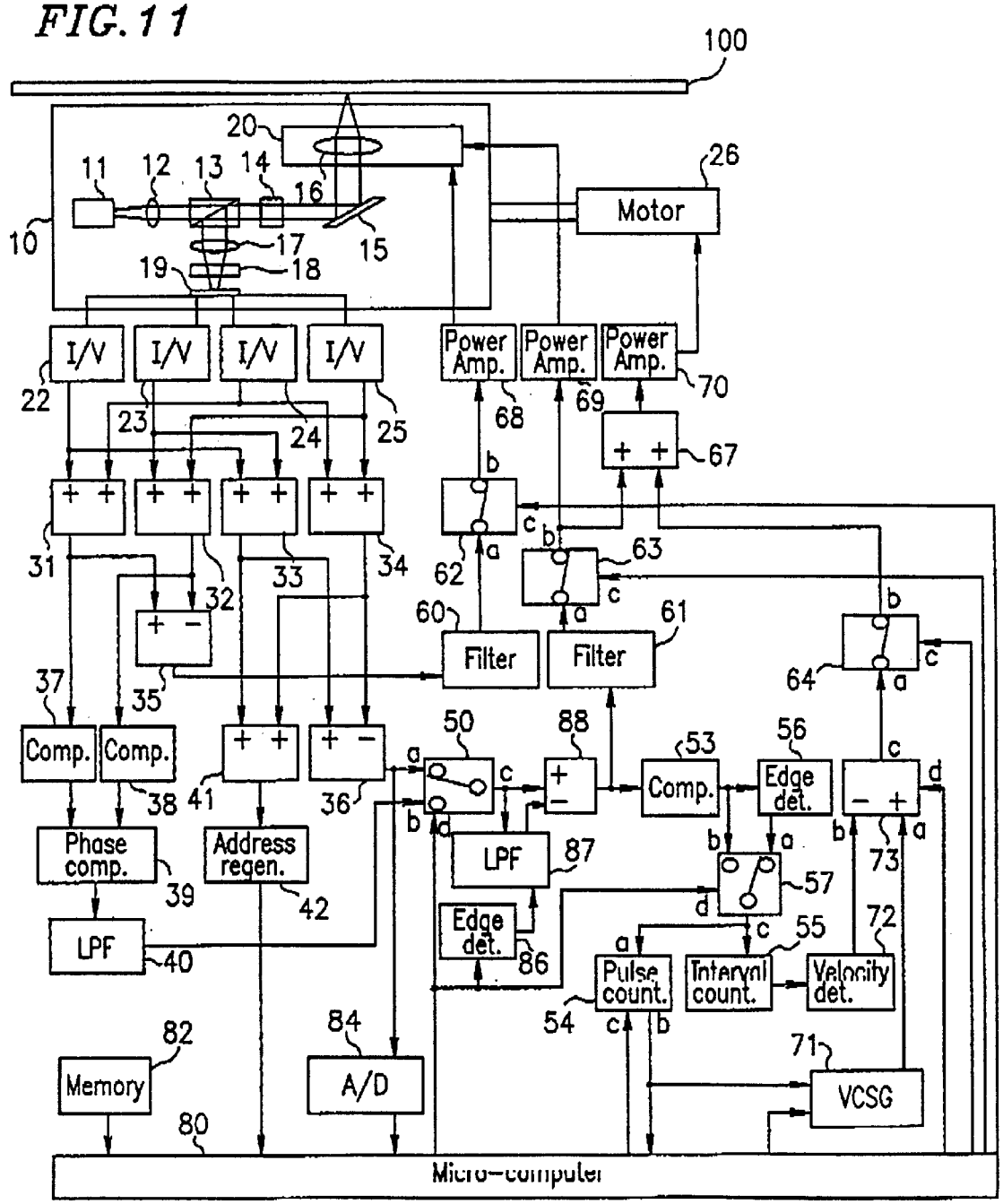
FIG. 11 is a block diagram showing the structure of an optical disk apparatus in accordance with a second embodiment of the present invention.

FIG. 11 is a block diagram showing the structure of the optical information apparatus of the present example having the above-mentioned feature. Component elements which correspond to those of the structure that were described with reference to FIG. 7 are indicated by like numerals, and the descriptions thereof are omitted.

Figure 12A:
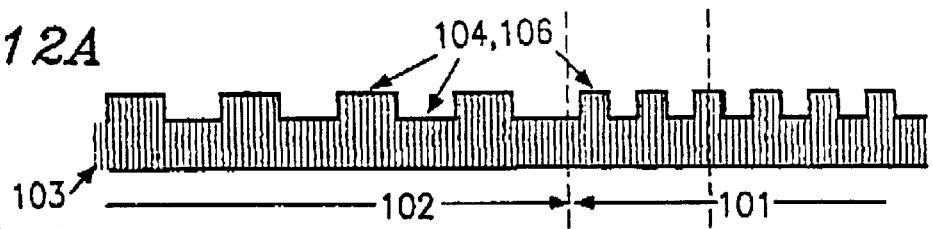
FIG. 12A is a schematic enlarged cross-sectional view showing a cross section of the optical disk shown in FIG. 6A along the radius direction thereof.
Figure 12B:
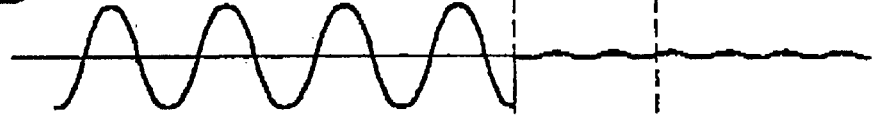
FIG. 12B is a diagram illustrating the tracking error signal according to the push-pull method.
Figure 12C:
FIG. 12C is a diagram illustrating the tracking error signal according to the phase difference method.
Figure 12D:
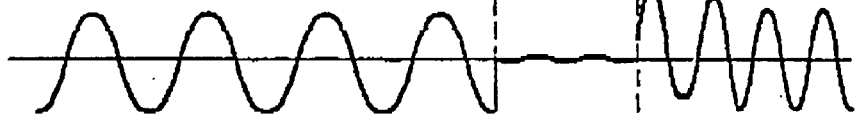
FIG. 12D is a diagram illustrating the output of the differential amplifier 88.
Figure 12E:
FIG. 12E is a diagram illustrating the track crossing signal which is output from the comparator 53.
Figure 12F:
FIG. 12F is a diagram illustrating the output of the edge detector 56.
Figure 12G:
FIG. 12G is a diagram illustrating the output of the switch 57.
Figure 12H:
FIG. 12H is a diagram illustrating the output of the microcomputer 80 to the switches 50 and 57.
Figure 12I:
FIG. 12I is a diagram illustrating the output from the edge detector 86 to the low-pass filter 87.

FIG. 12A is a schematic enlarged cross-sectional view showing a cross section of the optical disk 100 along the radius direction at a portion including the boundary between the RAM region 101 and the ROM region 102. FIG. 12B is a diagram illustrating the TES output from the differential amplifier 36 according to the push-pull method. FIG. 12C is a diagram illustrating the TES output from the low-pass filter 40 according to the phase difference method. FIG. 12D is a diagram illustrating the output of the differential amplifier 88. FIG. 12E is a diagram illustrating the track cross signal which is output from the comparator 53. FIG. 12F is a diagram illustrating the output of the edge detector 56. FIG. 12G is a diagram illustrating the output of the switch 57. FIG. 12H is a diagram illustrating the output of the microcomputer 80 to the switches 50 and 57. FIG. 12I is a diagram illustrating the output from the edge detector 86 to the low-pass filter 87.

In the structure shown in FIG. 11, an intermediate value between the amplitude of a TES in the ROM region 101 by the push-pull method and a TES in the RAM region 102 by the push-pull method is previously stored in the memory 82. The TES by the push-pull method as output from the differential amplifier 36 is supplied to the microcomputer 80 via an A/D convertor 84.

Next, an operation by the optical information apparatus of the present invention, in the case where a light beam which is located on a track in the RAM region 102 is moved to a desired track in the ROM region 101 following a search for the desired track, will be described.

Since the light beam is located in the RAM region 102 before beginning the track search in this exemplary operation, the microcomputer 80 outputs a high level signal to the switches 50 and 57, and closes the switches 62 and 63 to activate focus control and tracking control. As a result, the switch 50 selects as its output the output signal of the differential amplifier 36 (i.e., a TES by the push-pull method), thereby controlling the light beam to be located on a track within the RAM region 102.

Once the address At of the desired track in the ROM region 101 is input to the microcomputer 80, the microcomputer 80 obtains a current address A0 from the address regenerator 42 to calculate the number Nt (=At−A0) of tracks between the current track and the desired track, and sets Nt in the VCSG 71. Furthermore, the microcomputer 80 clears the count of the pulse counter 54. Thereafter, the microcomputer 80 opens the switch 63 to inactivate tracking control, sends a detection direction signal to the differential amplifier 73, and closes the switch 64 to move the base 10.

The microcomputer 80 derives the maximum and minimum values of the TES by the push-pull method sent from the A/D convertor 84, and detects the amplitude of the TES as a difference therebetween. The microcomputer 80 compares the detected amplitude value and the previously stored value in the memory 82 so as to output to the switches 50 and 57 a low level signal in the case where the former value is equal to or greater than the latter value and output a high level signal in the case where the former value is smaller than the latter value.

The amplitude level of the TES by the push-pull method in the RAM region 102 is larger than the predetermined level. Accordingly, microcomputer 80 outputs a high level signal to the switches 50 and 57. Responsive to this, the switch 50 selects as its output the output signal of the differential amplifier 36 (i.e., a TES by the pull-pull method), and the switch 57 selects as its output the output signal of the edge detector 56. The VCSG 71 generates a velocity command signal in accordance with Nt (i.e., the number of tracks between the current track and the desired track), which is supplied to the coarse motor 26 via the differential amplifier 73, the switch 64, the adder 67, and the power amplifier 70.

Thereafter, beginning at time t3 shown in FIG. 12B, the light beam enters the ROM region 101, from which time the TES by the push-pull method decreases in amplitude. The microcomputer 80 detects the amplitude level of the TES by the push-pull method in the above-described manner, and upon knowing that the detected amplitude value has become smaller than the value stored in the memory 82, outputs a low level signal to the switches 50 and 57. Responsive to this, the switch 50 selects as its output the output signal of the low-pass filter 40 (i.e., a TES by the phase difference method) and the switch 57 selects as its output the output signal of the comparator 53. It should be noted, however, that the actual change of the detection methods is taken place at timing t4 because of time lag required for detecting the amplitude change.

The microcomputer 80 reads the count of the pulse counter 54 and detects the number of tracks Np that have been crossed by the light beam since the track search was begun. Then, once the value Nt=Np (i.e., the number of remaining tracks) reaches zero, the microcomputer 80 opens the switch 64, resets the count of the pulse counter 54, and closes the switch 63 to activate tracking control. Thereafter, tracking control is performed based on a TES obtained by the phase difference method. The microcomputer 80 reads the address of the track at which the light beam is located and upon determining that the address is equal to the known address of the desired track, ends the search operation. If the microcomputer 80 determines that the address is not equal to the address of the desired track, the above-described search operation is repeated until the desired track is reached.

Next, an operation by the optical information apparatus of the present example, in the case where a light beam which is located on a track in the ROM region 101 is moved to a desired track in the RAM region 102 following a search for the desired track, will be described.

Since the light beam is located in the ROM region 101 before beginning the track search in this exemplary operation, the microcomputer 80 outputs a low level signal to the switches 50 and 57. As a result, the switch 50 selects as its output the output signal of the low-pass filter 40 (i.e., a TES by the phase difference method), while the switch 57 selects as its output the output signal of the comparator 53.

Thereafter, the microcomputer 80 sends a detection direction signal, indicating that the track search is to be performed toward the inner periphery of the optical disk, to the differential amplifier 73 to begin a track search operation. Once the detected amplitude value of the TES by the push-pull method exceeds the value stored in the memory 83 as the light beam enters the RAM region 102, the microcomputer 80 outputs a high level signal to the switches 50 and 57. Responsive to this, the switch 50 selects as its output the output signal of the differential amplifier 36 (i.e., a TES by the push-pull method), and the switch 57 selects as its output the output signal of the edge detector 56. As the count Np of the pulse counter 54 reaches NT (i.e., the number of tracks between the current track and the desired track), the track search operation ends in a manner similar to ending the search operation as discussed above. Thereafter, tracking control and track search using the TES by the push-pull method are performed.

Thus, in accordance with the present example, it is determined whether the light beam is travelling in the ROM region 101 or the RAM region 102 during track search, based on the amplitude level of the TES by the push-pull method. As a result, the travel distance (the amount of travel) and the travelling velocity (the velocity of travel) are measured based on a TES according to the phase difference method while the light beam is travelling in the ROM region 101, and based on a TES according to the push-pull method while the light beam is travelling in the RAM region 102. Thus, the travel distance and the travelling velocity are measured accurately so as to enable a search for the desired track quickly and yet stably. Since tracking control based on a TES by the phase difference method is performed in the ROM region 101 and tracking control based on a TES by the push-pull method is performed in the RAM region 102, the initiation of tracking control can be securely and stably made.

EXAMPLE 3

In the optical information apparatus according to the present example, during a track search operation for an optical disk 100 of the structure described in Example 1, it is determined whether the light beam is travelling in the ROM region or the RAM region by utilizing the change in the amplitude of a TES by the phase difference method.

Specifically, as seen from FIGS. 8E and 8F discussed above, the TES by the phase difference method can be detected, while the light beam is located within the ROM region 101, but is hardly detectable while the light beam is located within the RAM region 102. Therefore, according to the present example, the light beam is determined to be travelling in the ROM region 101 in the case where the amplitude of the TES by the phase difference method exceeds a predetermined value, and travelling in the RAM region 102 in the case where the amplitude of the TES by the phase difference method is smaller than the predetermined value.

Figure 13:
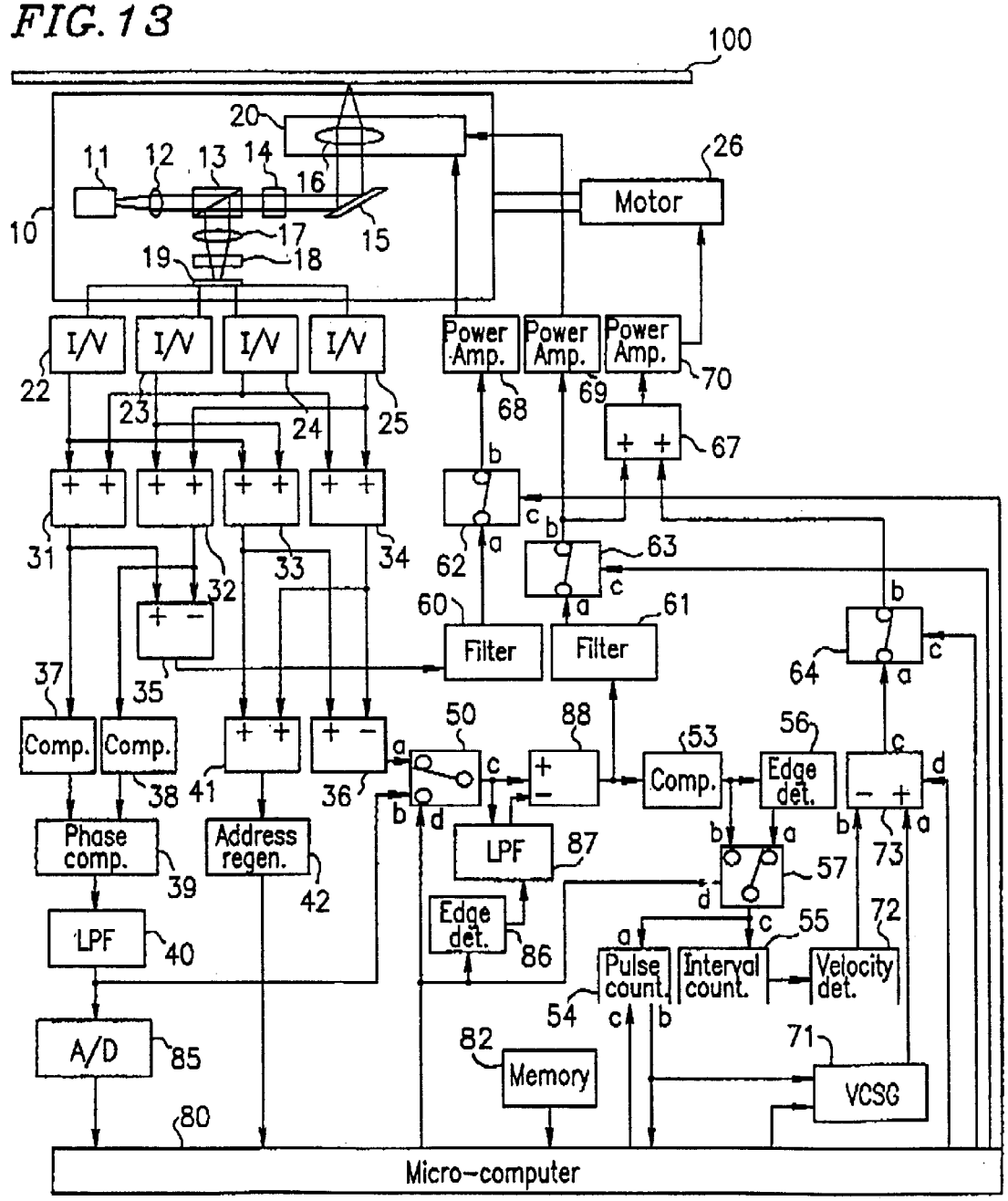
FIG. 13 is a block diagram showing the structure of an optical disk apparatus in accordance with a third embodiment of the present invention.

FIG. 13 is a block diagram showing the structure of the optical information apparatus of the present example having the above-mentioned feature. Component elements which correspond to those of the structure that were described with reference to FIG. 7 are indicated by like numerals, and the descriptions thereof are omitted.

In the structure shown in FIG. 13, an intermediate value between the amplitude of a TES in the ROM region 101 by the phase difference method and the zero amplitude level is previously stored in the memory 82. The TES by the phase difference method output from the low-pass filter 40 is supplied to the microcomputer 80 via an A/D convertor 85.

Next, an operation by the optical information apparatus of the present example, in the case where a light beam which is located on a track in the RAM region 102 is moved to a desired track in the ROM region 101 following a search for the desired track, will be described.

Since the light beam is located in the RAM region 102 before beginning the track search in this exemplary operation, the microcomputer 80 outputs a high level signal to the switches 50 and 57, and closes the switches 62 and 63 to activate focus control and tracking control. As a result, the switch 50 selects as its output the output signal of the differential amplifier 36 (i.e., a TES by the push-pull method), thereby controlling the light beam to be located on a track within the RAM region 102.

Once the address At of the desired track in the ROM region 101 is input to the microcomputer 80, the microcomputer 80 obtains a current address A0 from the address regenerator 42 to calculate the number Nt (=At−A0) of tracks between the current track and the desired track, and sets Nt in the VCSG 71. Furthermore, the microcomputer 80 clears the count of the pulse counter 54. Thereafter, the microcomputer 80 opens the switch 63 to inactivate tracking control, sends a detection direction signal to the differential amplifier 73, and closes the switch 64 to move the base 10.

The microcomputer 80 derives the maximum and minimum values of the TES by the phase difference method from the A/D convertor 85, and detects the amplitude of the TES as a difference therebetween. The microcomputer 80 compares the detected amplitude value and the previously stored value in the memory 82 so as to output to the switches 50 and 57 a low level signal in the case where the former value is equal to or greater than the latter value and output a high level signal in the case where the former value is smaller than the latter value.

The amplitude level of the TES by the phase difference method in the RAM region 102 is substantially zero. Accordingly, microcomputer 80 outputs a high level signal to the switches 50 and 57. Responsive to this, the switch 50 selects as its output the output signal of the differential amplifier 36 (i.e., a TES by the push-pull method), and the switch 57 selects as its output the output signal of the edge detector 56. The VCSG 71 generates a velocity command signal in accordance with Nt (i.e., the number of tracks between the current track and the desired track), which is supplied to the coarse motor 26 via the differential amplifier 73, the switch 64, the adder 67, and the power amplifier 70.

Thereafter, as the light beam enters and travels within the ROM region 101, the TES by the phase difference method begins to be output. The microcomputer 80 detects the amplitude level of the TES by the phase difference method in the above-described manner, and upon knowing that the detected amplitude value has exceeded the value stored in the memory 82, outputs a low level signal to the switches 50 and 57. Responsive to this, the switch 50 selects as its output the output signal of the low-pass filter 40 (i.e., a TES by the phase difference method) and the switch 57 selects as its output the output signal of the comparator 53.

The microcomputer 80 reads the count of the pulse counter 54 and detects the number of tracks Np that have been crossed by the light beam since the track search was begun. Then, once the value Nt−Np (i.e., the number of remaining tracks) reaches zero, the microcomputer 80 opens the switch 64, resets the count of the pulse counter 54, and closes the switch 63 to activate tracking control. Thereafter, tracking control is performed based on a TES obtained by the phase difference method. The microcomputer 80 reads the address of the track at which the light beam is located and upon determining that the address is equal to the known address of the desired track, ends the search operation. If the microcomputer 80 determines that the address is not equal to the address of the desired track, the above-described search operation is repeated until the desired track is reached.

Next, an operation by the optical information apparatus of the present example, in the case where a light beam which is located on a track in the ROM region 101 is moved to a desired track in the RAM region 102 following a search for the desired track, will be described.

Since the light beam is located in the ROM region 101 before beginning the track search in this exemplary operation, the microcomputer 80 outputs a low level signal to the switches 50 and 57. As a result, the switch 50 selects as its output the output signal of the low-pass filter 40 (i.e., a TES by the phase difference method), while the switch 57 selects as its output the output signal of the comparator 53.

Thereafter, the microcomputer 80 sends a detection direction signal, indicating that the track search is to be performed toward the inner periphery of the optical disk, to the differential amplifier 73 to begin a track search operation. Once the amplitude level of the TES by the phase difference method becomes substantially zero (and hence smaller than the value stored in the memory 82) as the light beam enters the RAM region 102, the microcomputer 80 outputs a high level signal to the switches 50 and 57. Responsive to this, the switch 50 selects as its output the output signal of the differential amplifier 36 (i.e., a TES by the push-pull method), and the switch 57 selects as its output the output signal of the edge detector 56. As the count Np of the pulse counter 54 reaches Nt (i.e., the number of tracks between the current track and the desired track), the track search operation ends in a manner similar to ending the search operation as discussed above. Thereafter, tracking control and track search using the TES by the push-pull method are performed.

Thus, in accordance with the present invention, it is determined whether the light beam is travelling in the ROM region 101 or the RAM region 102 during track search, based on the amplitude level of the TES by the phase difference method. As a result, the travel distance (the amount of travel) and the travelling velocity (the velocity of travel) are measured based on a TES according to the phase difference method while the light beam is travelling in the ROM region 101, and based on a TES according to the push-pull method while the light beam is travelling in the RAM region 102. Thus, the travel distance and the travelling velocity are measured accurately so as to enable a search for the desired track quickly and yet stably. Since tracking control based on a TES by the phase difference method is performed in the ROM region 101 and tracking control based on a TES by the push-pull method is performed in the RAM region 102, the initiation of tracking control can be securely and stably made.

EXAMPLE 4

In the optical information apparatus according to the present example, during a track search operation for an optical disk 100 of the structure described in Example 1, it is determined whether the light beam is travelling in the ROM region or the RAM region by utilizing the change in the amplitude of a TES by the phase difference method when searching from the RAM region toward the ROM region, and by utilizing the change in the amplitude of a TES by the push-pull method when searching from the ROM region toward the RAM region.

Figure 14:
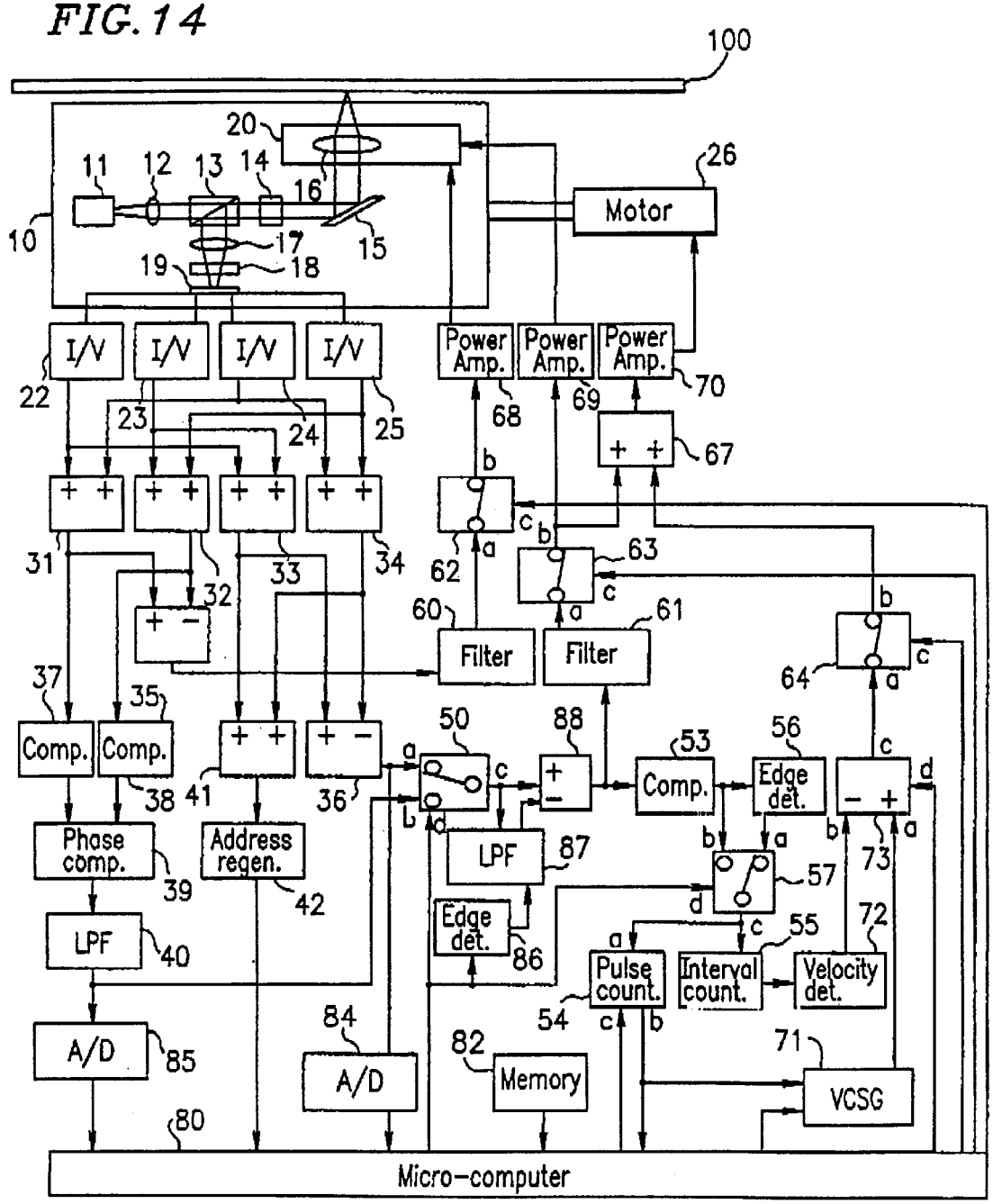
FIG. 14 is a block diagram showing the structure of an optical disk apparatus in accordance with a fourth embodiment of the present invention.

FIG. 14 is a block diagram showing the structure of the optical information apparatus of the present example having the above-mentioned feature. Component elements which correspond to those of the structure that were described with reference to FIG. 7 are indicated by like numerals, and the descriptions thereof are omitted.

In the structure shown in FIG. 14, a value, which is larger than the maximum amplitude level of the TES by the push-pull method in the ROM region 101 but smaller than the maximum amplitude level of the TES by the phase difference method in the ROM region 101 and also smaller than the maximum amplitude level of the TES by the push-pull method in the RAM region 102, is previously stored in the memory 82. The TES by the phase difference method output from the low-pass filter 40 is supplied to the microcomputer 80 via the A/D convertor 85.

Next, an operation by the optical information apparatus of the present example, in the case where a light beam which is located on a track in the RAM region 102 is moved to a desired track in the ROM region 101 following a search for the desired track, will be described.

Since the light beam is located in the RAM region 102 before beginning the track search in this exemplary operation, the microcomputer 80 outputs a high level signal to the switches 50 and 57, and closes the switches 62 and 63 to activate focus control and tracking control. As a result, the switch 50 selects as its output the output signal of the differential amplifier 36 (i.e., a TES by the push-pull method), thereby controlling the light beam to be located on a track within the RAM region 102.

Once the address At of the desired track in the ROM region 101 is input to the microcomputer 80, the microcomputer 80 obtains a current address A0 from the address regenerator 42 to calculate the number Nt (=At−A0) of tracks between the current track and the desired track, and sets Nt in the VCSG 71. Furthermore, the microcomputer 80 clears the count of the pulse counter 54. Thereafter, the microcomputer 80 opens the switch 63 to inactivate tracking control, sends a detection direction signal to the differential amplifier 73, and closes the switch 64 to move the base 10.

The microcomputer 80 derives the maximum and minimum values of the TES by the phase difference method from the A/D convertor 85, and detects the amplitude of the TES as a difference therebetween. The microcomputer 80 compares the detected amplitude value and the previously stored value in the memory 82 so as to output to the switches 50 and 57 a low level signal when and after the former value has become greater than the latter value for the first time after the track search was begun, and output a high level signal if the former value is always smaller than the latter value after the track search was begun.

The amplitude level of the TES by the phase difference method in the RAM region 102 is substantially zero. Accordingly, microcomputer 80 outputs a high level signal to the switches 50 and 57. Responsive to this, the switch 50 selects as its output the output signal of the differential amplifier 36 (i.e., a TES by the push-pull method), and the switch 57 selects as its output the output signal of the edge detector 56. The VCSG 71 generates a velocity command signal in accordance with Nt (i.e., the number of tracks between the current track and the desired track), which is supplied to the coarse motor 26 via the differential amplifier 73, the switch 64, the adder 67, and the power amplifier 70.

Thereafter, as the light beam enters and travels within the ROM region 101, the TES by the phase difference method begins to be output. The microcomputer 80 detects the amplitude level of the TES by the phase difference method in the above-described manner, and upon knowing that the detected amplitude value has exceeded the value stored in the memory 82, outputs a low level signal to the switches 50 and 57. Responsive to this, the switch 50 selects as its output the output signal of the low-pass filter 40 (i.e., a TES by the phase difference method) and the switch 57 selects as its output the output signal of the comparator 53.

The microcomputer 80 reads the count of the pulse counter 54 and detects the number of tracks Np that have been crossed by the light beam since the track search was begun. Then, once the value Nt−Np (i.e., the number of remaining tracks) reaches zero, the microcomputer 80 opens the switch 64, resets the count of the pulse counter 54, and closes the switch 63 to activate tracking control. Thereafter, tracking control is performed based on a TES obtained by the phase difference method. The microcomputer 80 reads the address of the track at which the light beam is located and upon determining that the address is equal to the known address of the desired track, ends the search operation. If the microcomputer 80 determines that the address is not equal to the address of the desired track, the above-described search operation is repeated until the desired track is reached.

Next, an operation by the optical information apparatus of the present example, in the case where a light beam which is located on a track in the ROM region 101 is moved to a desired track in the RAM region 102 following a search for the desired track, will be described.

Since the light beam is located in the ROM region 101 before beginning the track search in this exemplary operation, the microcomputer 80 outputs a low level signal to the switches 50 and 57. As a result, the switch 50 selects as its output the output signal of the low-pass filter 40 (i.e., a TES by the phase difference method), while the switch 57 selects as its output the output signal of the comparator 53.

Thereafter, the microcomputer 80 sends a detection direction signal, indicating that the track search is to be performed toward the inner periphery of the optical disk, to the differential amplifier 73 to begin a track search operation. Moreover, the microcomputer 80 is measuring the amplitude level of the TES by the push-pull method sent from the A/D convertor 84. The microcomputer 80 compares the measured signal amplitude level and the value stored in the memory 82 so as to output a high level signal when and after the former value has become greater than the latter value for the first time after the track search was begun, and output a low level signal if the former value is always smaller than the latter value after the track search was begun.

If the amplitude level of the TES by the push-pull method exceeds the value stored in the memory 82 as the light beam enters the RAM region 102, the microcomputer 80 outputs a high level signal to the switches 50 and 57. Responsive to this, the switch 50 selects as its output the output signal of the differential amplifier 36 (i.e., a TES by the push-pull method), and the switch 57 selects as its output the output signal of the edge detector 56. As the count Np of the pulse counter 54 reaches Nt (i.e., the number of tracks between the current track and the desired track), the track search operation ends in a manner similar to ending the search operation as discussed above. Thereafter, tracking control and track search using the TES by the push-pull method are performed.

Thus, in accordance with the present example, it is determined whether the light beam is travelling in the ROM region 101 or the RAM region 102 during track search, by utilizing the change in the amplitude of a TES by the phase difference method when searching from the RAM region toward the ROM region, and by utilizing the change in the amplitude of the TES by the push-pull method when searching from the ROM region toward the RAM region. As a result, the travel distance (the amount of travel) and the travelling velocity (the velocity of travel) are measured based on a TES according to the phase difference method while the light beam is travelling in the ROM region 101, and based on a TES according to the push-pull method while the light beam is travelling in the RAM region 102. Thus, the travel distance and the travelling velocity are measured accurately so as to enable a search for the desired track quickly and yet stably. Since tracking control based on a TES by the phase difference method is performed in the ROM region 101 and tracking control based on a TES by the push-pull method is performed in the RAM region 102, the initiation of tracking control can be securely and stably made.

Thus, according to the present invention, it is determined whether the light beam is travelling in the ROM region or the RAM region during track search, and performs tracking control and track search by selectively utilizing the TES by the phase difference method and the TES by the push-pull method in accordance with the determination result. Specifically, the travel distance and the travelling velocity are measured based on a TES according to the phase difference method while the light beam is travelling in the TOM region, and based on a TES according to the push-pull method while the light beam is travelling in the RAM region. Thus, the travel distance and the travelling velocity are measured accurately so as to enable a search for the desired track quickly and yet stably.

Since tracking control based on a TES by the phase difference method is performed in the ROM region and tracking control based on a TES by the push-pull method is performed in the RAM region, the initiation of tracking control can be securely and stably made.

Various other modifications will be apparent to and can be readily made by those skilled in the art without departing from the scope and spirit of this invention. Accordingly, it is not intended that the scope of the claims appended hereto be limited to the description as set forth herein, but rather than the claims be broadly construed.

What is claimed is:

1. An optical information apparatus for performing at least one of a reproduction operation and a recording operation for an information medium by radiating a light beam on the information medium, the information medium having a first region including a first track having information recorded thereon in the form of convex and concave pits and a second region including a second track formed in the form of convex and concave guide grooves, the apparatus comprising:

first tracking error detection means for detecting an error in position between the light beam and the first track in the first region;

second tracking error detection means for detecting an error in position between the light beam and the second track in the second region; and search means for measuring a travel condition of the light beam over the information medium based on at least one of an output signal of the first tracking error detection means and an output signal of the second tracking error detection means, and moving the light beam for a desired track on the information medium based on a result of measurement, wherein the search means determines whether the light beam is located in the first region or the second region, and when the search means determines that the light beam is located in the first region, the search means performs the measurement based on the output signal of the first tracking error detection means, and when the search means determines that the light beam is located in the second region, the search means performs the measurement based on the output signal of the second tracking error detection means.

2. An optical information apparatus according to claim 1, wherein the search means measures an amount of travel of the light beam over the information medium as the travel condition.

3. An optical information apparatus according to claim 1, wherein the search means measures a velocity of travel of the light beam with respect to the tracks as the travel condition.

4. An optical information apparatus according to claim 1, wherein the search means determines the location of the light beam based on an amplitude of the output signal of the first tracking error detection means as the travel condition.

5. An optical information apparatus according to claim 1, wherein the search means determines the location of the light beam based on an amplitude of the output signal of the second tracking error detection means as the travel condition.

6. An optical information apparatus according to claim 1, wherein the search means determines the location of the light beam based on an amplitude of the output signal of the second tracking error detection means during search from the second region toward the first region, and based on an amplitude of the output signal of the first tracking error detection means during search from the first region toward the second region as the travel condition.

7. An optical information apparatus according to claim 1, wherein the first region is a read only memory region and the second region is a random access memory region.

8. An optical information apparatus according to claim 1, wherein the first tracking error detection means generates the output signal in accordance with a phase difference method, and the second tracking error detection means generates the output signal in accordance with a push-pull method.

9. An optical information apparatus according to claim 1, wherein the search means detects whether or not the light beam has passed a boundary between the first region and the second region in order to determine whether the light beam is located in the first region or the second region.

* * * * *